(12) United States Patent
Kano

(10) Patent No.: US 7,549,171 B2
(45) Date of Patent: Jun. 16, 2009

(54) METHOD AND APPARATUS FOR VALIDATION OF APPLICATION DATA ON A STORAGE SYSTEM

(75) Inventor: Yoshiki Kano, Sunnyvale, CA (US)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/866,413

(22) Filed: Jun. 10, 2004

(65) Prior Publication Data

US 2005/0278529 A1 Dec. 15, 2005

(51) Int. Cl.
*H04K 1/00* (2006.01)
(52) U.S. Cl. ............... 726/27; 726/2; 726/26; 713/165; 713/185; 709/219; 709/229
(58) Field of Classification Search ............... 713/185, 713/200, 165, 168, 193; 705/44; 726/2, 726/5, 6, 26, 27; 709/219, 229
See application file for complete search history.

(56) References Cited

U.S. PATENT DOCUMENTS

| | | | | |
|---|---|---|---|---|
| 5,201,040 | A * | 4/1993 | Wada et al. ............... 711/147 |
| 5,737,523 | A * | 4/1998 | Callaghan et al. ............ 726/21 |
| 5,748,890 | A * | 5/1998 | Goldberg et al. ............... 726/2 |
| 5,889,952 | A * | 3/1999 | Hunnicutt et al. ........... 709/219 |
| 5,923,756 | A * | 7/1999 | Shambroom ............... 713/156 |
| 5,956,481 | A * | 9/1999 | Walsh et al. ................ 726/23 |
| 6,192,408 | B1 * | 2/2001 | Vahalia et al. .............. 709/229 |
| 6,243,816 | B1 * | 6/2001 | Fang et al. ..................... 726/5 |
| 6,339,793 | B1 * | 1/2002 | Bostian et al. .............. 709/229 |
| 6,412,070 | B1 * | 6/2002 | Van Dyke et al. ............ 726/17 |
| 6,457,130 | B2 * | 9/2002 | Hitz et al. .................... 726/27 |
| 6,516,315 | B1 | 2/2003 | Gupta |
| 6,643,654 | B1 * | 11/2003 | Patel et al. .................. 707/10 |
| 6,678,828 | B1 * | 1/2004 | Pham et al. .................... 726/2 |
| 6,708,170 | B1 | 3/2004 | Byrne et al. |
| 6,775,783 | B1 * | 8/2004 | Trostle .......................... 726/6 |
| 6,792,424 | B1 | 9/2004 | Burns et al. |
| 6,859,878 | B1 * | 2/2005 | Kerr et al. ................... 713/183 |
| 6,931,450 | B2 * | 8/2005 | Howard et al. ............. 709/229 |
| 7,062,750 | B2 * | 6/2006 | Whidby et al. ............. 717/103 |
| 7,100,049 | B2 * | 8/2006 | Gasparini et al. ........... 713/170 |
| 7,107,610 | B2 * | 9/2006 | Lortz ............................ 726/4 |
| 7,150,042 | B2 * | 12/2006 | Wolff et al. .................. 726/22 |
| 7,165,096 | B2 * | 1/2007 | Soltis ........................ 709/217 |
| 7,188,136 | B1 * | 3/2007 | Aoshima et al. ............ 709/203 |
| 7,191,225 | B1 * | 3/2007 | Borthakur .................. 709/213 |

(Continued)

OTHER PUBLICATIONS

Chapter 6, NFS Version 2, pp. 91-130.

(Continued)

*Primary Examiner*—Nasser G Moazzami
*Assistant Examiner*—Shanto M Abedin
(74) *Attorney, Agent, or Firm*—Mattingly & Malur, PC

(57) ABSTRACT

An authentication processing method and system includes an access control list on both a client system and a storage server system. The access control list stores authentication information for individual files. The authentication information is accessed and used to authenticate an application when the application requests access to a file. The client system adds information from the access control list to a data request sent to the storage server system. The storage server system controls access to the requested file based upon the information included with the data request and the access control list on the storage server system.

19 Claims, 9 Drawing Sheets

U.S. PATENT DOCUMENTS

| | | |
|---|---|---|
| 7,203,697 B2 * | 4/2007 | Chang et al. .............. 707/102 |
| 7,231,397 B2 * | 6/2007 | Madhavarapu et al. ...... 707/101 |
| 2002/0129047 A1 * | 9/2002 | Cane et al. ................. 707/204 |
| 2002/0169986 A1 | 11/2002 | Lortz |
| 2003/0074417 A1 * | 4/2003 | Kasako et al. .............. 709/217 |
| 2003/0158836 A1 * | 8/2003 | Venkatesh et al. ............. 707/1 |
| 2004/0064713 A1 * | 4/2004 | Yadav ...................... 713/193 |
| 2004/0078568 A1 * | 4/2004 | Pham et al. ................ 713/165 |
| 2004/0107342 A1 * | 6/2004 | Pham et al. ................ 713/165 |
| 2004/0122917 A1 * | 6/2004 | Menon et al. .............. 709/219 |
| 2004/0193879 A1 * | 9/2004 | Sonoda et al. ............. 713/165 |
| 2005/0022024 A1 * | 1/2005 | Hashimoto ................. 713/201 |
| 2005/0086294 A1 * | 4/2005 | Kodama .................... 709/203 |
| 2005/0086491 A1 * | 4/2005 | Haugh et al. ............... 713/182 |
| 2005/0131902 A1 * | 6/2005 | Saika ......................... 707/10 |

OTHER PUBLICATIONS

Chapter 4, RPC Authentication, pp. 43-80.

* cited by examiner

Fig. 3

| File System | Directory and File | File ID | Authentications | | | | | | | |
|---|---|---|---|---|---|---|---|---|---|---|
| | | | ID | Key | ID | Key | ID | Key | | |
| FS1 | /db1.dat | 230 | user1@mail.xxx | x1ds3dfss | ... | ... | ... | ... | | |
| FS2 | /redo1.log | 331 | user2@mail.yyy | x3adkdec | ... | ... | ... | ... | | |
| ... | ... | ... | ... | ... | | | | | | |

Fig. 4

```
set_authentication (char *filename, int authentication method, char *username, char *key, .....)

release_authentication (char *filename, int authentication method, char *username, char *key, .....)
``` extension of NFS V2
Read request

```
fhandle    file;
uint    32 offset
uinit32 count;
uinit32 total count;
int    authentication_method
int    size_of_username
Opaque<MAXDATA> username
int    size_of_key
Opaque<MAXDATA> key
```

Fig. 6A extension of NFS V2
Write request

```
fhandle    file;
uint    32 offset
uinit32 count;
uinit32 total count;
Opaque<MAXDATA> data
int    authentication_method
int    size_of_username
Opaque<MAXDATA> username
int    size_of_key
Opaque<MAXDATA> key
```

Fig. 6B

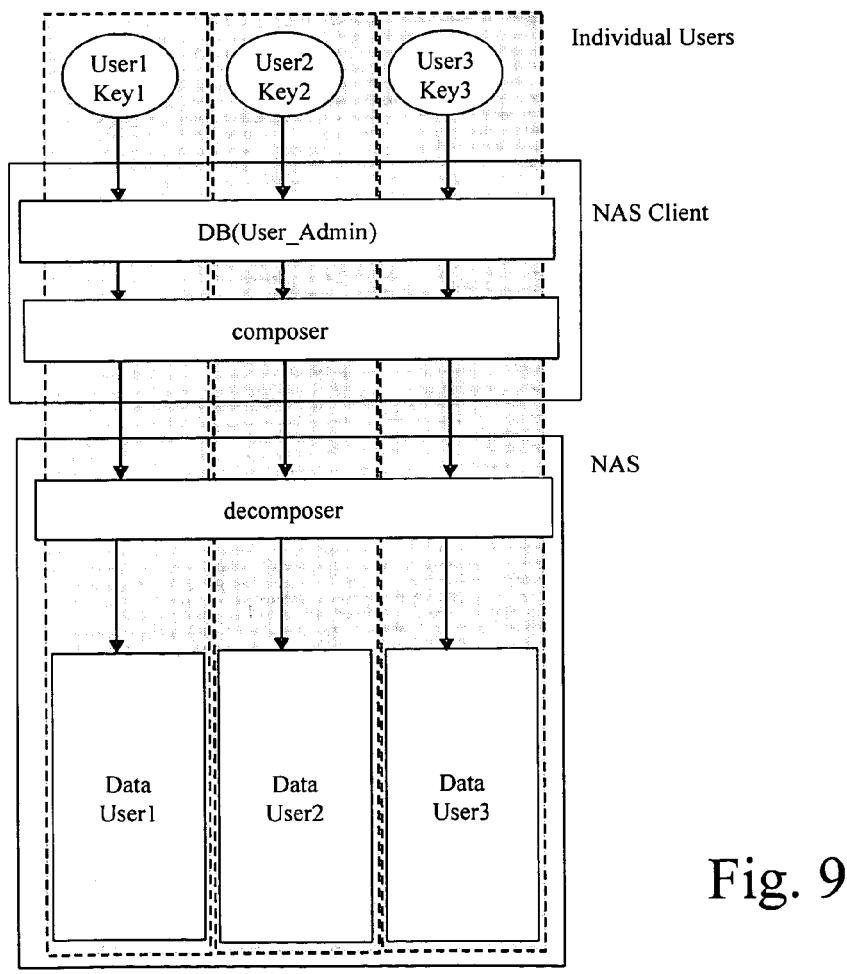

Fig. 9

METHOD AND APPARATUS FOR VALIDATION OF APPLICATION DATA ON A STORAGE SYSTEM

BACKGROUND OF THE INVENTION

The present invention relates generally to storage systems and in particular to validation of data on a storage system.

Computerization of personal information has created great challenges in ensuring the security of such sensitive data, while at the same time providing easy access by authorized personnel in order to provide needed services. For example, financial institutions and health care organizations maintain highly sensitive data. Financial and health care personnel are typical authorized users who need frequent access to the stored information. However, any large enterprise will employ system maintenance personnel who maintain the computers and data storage devices, but who are typically not authorized to access the stored data. Generally, in any large facility where there is sensitive information, there are people who have authorized access to such data and there are those who can access such data but who are not authorized to do so.

Therefore, it would be desirable to provide additional access control in a data storage facility.

BRIEF SUMMARY OF THE INVENTION

The present invention is directed to a method and system for authenticated access of data on a data server system, the access occurring from a client system. Authentication information is associated with one or more files. Authentication processing is performed on a file when an application attempts to issues a read or a write operation to the file.

The present invention provides a method and a system of authentication between applications and a storage system server. A typical embodiment of the present invention includes a NAS storage server. The NAS server includes an authentication server (decomposer) to give a client access permission. The client uses authentication request modules (composer) comprising APIs or a CLI (Command line interface) to request access permission from the NAS server on behalf of the applications.

BRIEF DESCRIPTION OF THE DRAWINGS

Aspects, advantages, and novel features of the present invention will become apparent from the following description of the invention presented in conjunction with the accompanying drawings, wherein:

FIG. 3 illustrates an example of an access control list in accordance with an embodiment of the present invention;

FIG. 4 show examples of APIs for managing the ACL;

FIGS. 6A and 6B illustrate modifications to the NFS client in accordance with an embodiment of the present invention;

FIG. 9 shows an embodiment of the present invention in a database application.

DETAILED DESCRIPTION OF THE INVENTION

Figure 1:
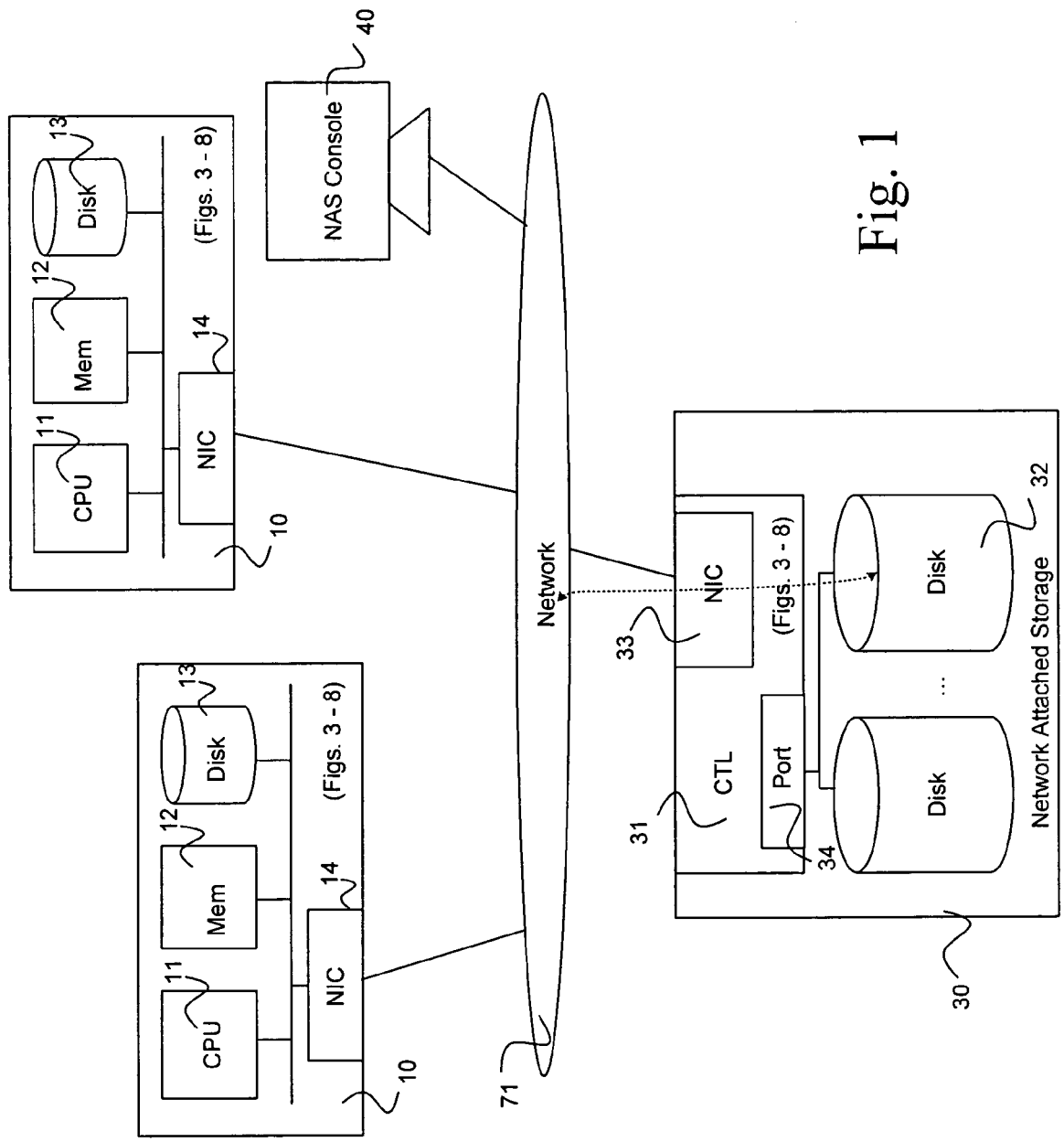
FIG. 1 is a block diagram showing a configuration of a computer system to which a first embodiment of the present invention is applied.

The system shown in FIG. 1 includes client systems 10 in data communication with a network 71. The network can be any suitable communication network, including but not limited to a local area network (LAN), wide area network (WAN), the Internet, and so on. Each client 10 typically comprises a data processing system, having components such as a central processing unit (CPU) 11, a memory component 12, and local storage 13. The client 10 is configured with a suitable communication interface 14 for communication over the network 71; e.g. network interface card (NIC). As will be discussed in more detail below, the client 10 is configured with various software components to operate in accordance with the present invention.

A server system 30 is coupled to the network 71. The server 30 provides data storage facilities, represented by disks 32 (storage system), to provide data storage for the clients 10. A suitable controller unit 31 provides a communication interface between the server 30 and the network 71. The controller unit includes a network interface portion 33 which interfaces with the network 71 and one or more ports 34 which interface with the disks 32. Merely as an example, the server 30 shown in FIG. 1 is a network attached storage (NAS) server. As will be discussed in further detail below, the controller unit 31 is configured according to aspects of the present invention. It will become clear in the following discussion, that other storage server configurations can be readily adapted according to the present invention.

FIG. 1 shows an administrative console 40 that is typically provided for servers to administer maintenance tasks and other related tasks to maintain the server 30. The figure shows the console 40 to be in data communication with the server 30 via the network 71. It can be appreciated that the console can be directly connected to a port on the server. In the particular embodiment shown in FIG. 1, the administrative console 40 is a NAS console to facilitate maintenance of the NAS server. As will be discussed, the console 40 is configured with software components to operate in accordance with aspects of the present invention.

Figure 2:
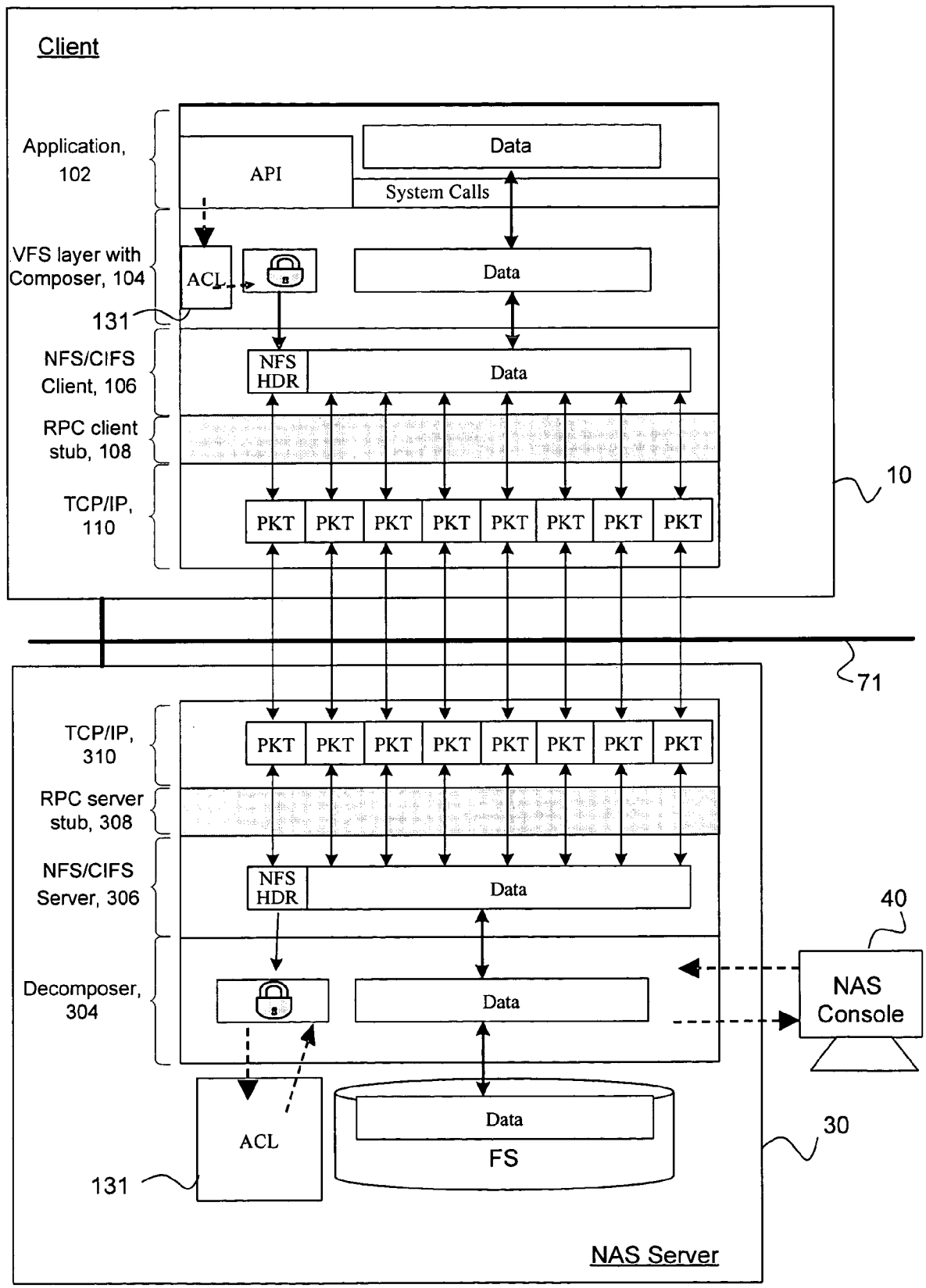
FIG. 2 is functional diagram according to an embodiment of the present invention.

FIG. 2 is a diagram showing the functional components according to an embodiment of the present invention. The client 10 executes various programs, including an operating system (OS) and application programs. The OS provides an application program 102 access to the underlying hardware (e.g., memory, storage, I/O, and so on) by way of system services. The OS comprises system-level programs (system calls) which the application program can invoke to access a system service such as reading data from storage and writing data to storage.

A virtual file system (VFS) component provides the client applications with an application programming interface (API) for accessing various different file systems. The application 102 invokes programs which comprise the VFS component 104 via the API to obtain file access services. In accordance with this particular embodiment of the present invention, the VFS component includes a composer 104 which will be discussed further below. An access control list (ACL) 31, likewise, will be discussed in greater detail below.

An NFS client 106 provides remote file access using NFS protocol or CIFS (common internet file system) protocol. It will be explained below that the NFS client 106 can be configured to operate in accordance with an embodiment the present invention. An RPC (remote procedure call) client stub 108 allows the NFS client 106 to communicate with its counterpart NFS server 306 in the server 30. A TCP/IP layer 110 provides the low level transport protocol for communication over the network 71. The TCP/IP layer produces packets (PKT) that can then be sent over the network 71 to the server 30. It will be understood from the discussion which follows, that other protocol schemes can be used, and if necessary, can be suitably adapted in accordance with the present invention.

At the server 30, a similar TCP/IP layer 310 receives and transmits packets (PKT) from and to a client 10. An RPC server stub 308 is provided to allow an NFS server 306 to communicate with its counterpart NFS client 106. It will be discussed below that the NFS server 306 can be configured to operate in accordance with an embodiment of the present invention. A decomposer layer 304 will be discussed in further detail below. The disks 32 (FIG. 1) contain a file system (FS) which hold data that is read by the clients 10 and supplied by the clients.

FIG. 3 shows an ACL (access control list) 31 in accordance with an embodiment of the present invention. The ACL 131 is shown in tabular form for convenience. It is understood that any suitable data structure can be used. Generally, as the name implies, the ACL 131 provides file-level access control. Thus, each entry in the ACL corresponds to a file for which access control is desired.

Each entry in the ACL 131 includes a File System field 47 identifies a mount point of the file system that is used by NFS. A Directory field 41 holds information indicative of the directory in which the file is located, or of the file itself. A FileID field 44 contains information that identifies the file; e.g., FIG. 3 uses a numeric value. An Authentications field 46 contains a list of users who can access the file identified in the FileID field 44.

The Authentication field 46 comprises zero or more ID-key pairs 45. Each ID-key pair comprises an ID field 42 and a Key field 43 (e.g., a user password). The ID field 42 contains information representative of the user. As will become clear in the discussion below, access to a file is permitted if the user attempting the access has an ID-key pair 45 in the Authentication field 46 that is associated with the file being accessed.

The ACL 131 shown in FIG. 3 is used for both read access and write access. It will be appreciated in the discussion below that additional ACL tables can be provide for different file access operations. Thus, if a read operation is attempted, a first ACL table can be consulted. If a delete operation is attempted, a second ACL table can be consulted. If a write operation is attempted, a third ACL table can be consulted, and so on.

In accordance with an embodiment of the present invention, the console 40 is configured to initialize and otherwise maintain the ACL 131. The file information that populates the ACL can be ported via an LDAP (lightweight directory access protocol) server, a NIS (network information service) server, or by some other automated mechanism. Thus, the File System field 47, the Directory field 41, the FileID field 42 and the ID fields 42 can be obtained in an automated fashion via LDAP, or an administrative type user can enter individual file and user information. The Key fields 43 can be filled in by the users identified in the ID fields 42 by accessing the server 30.

When the ACL 131 in the server 30 is initialized, it is the uploaded to the clients 10. This can be accomplished by a client 10 by requesting an upload of the server's ACL, and storing it in the client; e.g., data store 13 (FIG. 1).

FIG. 4 illustrates an API to set authentication and an API to release authentication. The set authentication API is invoked by passing the following arguments (parameters): a file name of the file to be accessed; an authentication method, which will be discussed below; a user name of the user who wants to access the file; and a key. The set authentication API is a procedure that is used to populate the entries in the ACL 131 with authentication data. The release authentication API is invoked with the same arguments as the set authentication API. The release authentication API a procedure that is used to remove a user from the specified file. A convention can be adopted where a NULL pointer for the user name can indicate removing the file from the ACL 131.

It can be appreciated that the foregoing APIs can be implemented in a command line interface (CLI), providing an administrator with a software tool to set and release file authentication. For example, a CLI counterpart to the set API might have the following command line format:

set_authentication -f filename -d authentication_method -u user_name1 -f key1 . . .

Likewise, the CLI counterpart for the release API might have the following command line format:

release_authentication -f filename -d authentication_method -u user_name1 -f key1 . . .

In an alternate embodiment, the Key fields 43 in the ACL 131 can be initialized to a NULL value when the ACL is created in the server 30. The ACL 131 can be uploaded to the various clients 10 with the NUL Key fields 43. Users at each client site can then add their passwords to the Key fields at a later and more convenient time. This embodiment requires that ACLs 131 from different clients 10 have to be downloaded to the server 30, merged into a single ACL, and then uploaded back to the clients.

In one embodiment of the present invention, authentication processing is provided by modifying the NFS client 106 to work with the composer 104 in the VFS layer, and modifying the NFS server 306 to work with the decomposer 304. In another embodiment of the present invention, the NFS layers 106, 306 are unaffected. Instead, the authentication processing is achieved by passing data in the data component of the NFS protocol.

Modified NFS Layers

In this particular embodiment of the present invention, suitable modifications are made to library routines comprising the NFS client 106 and the NFS server 306. The affected routines include: OPEN, CLOSE, READ, and WRITE.

OPEN Routine

The API for the NFS open( ) function is unchanged. However, the processing of the invocation is modified in the following manner:

The user application 102 invokes the open( ) function, specifying at least a file name.

The VFS layer forwards the open( ) call to the NFS client 106.

The NFS client 106 communicates with the NFS server 306 in the usual manner to attempt to open the specified (target) file.

The result of the open attempt is returned to the NFS client 106 and then to the VFS layer.

Assuming the open attempt was successful, the VFS layer can detect this by checking a result code returned from the NFS client 106. Upon detecting a successful open attempt, the composer 104 in the VFS layer will consult the ACL 131 to access the entry associated with the file name specified in the open( ) call. The composer 104 then, searches through the Authentication field 46 of the accessed entry to find the ID-key pair 45 that is associated with the user. A system call or some other procedure can be provided to obtain the user information; e.g., in a Unix environment, the system call getuid( ) can be used. The VFS can set some internal flags that are associated with the file to indicate that authentication processing is to be performed on this file for subsequent read and write operations.

The VFS layer then returns the result of the open attempt back to the application 102. The application is not aware of the additional processing of the ACL 131.

If the file is found, but the user is not in the Authentication field 46, then the VFS layer can return a suitable error code to the application 102, indicating that the user is not authorized to access the file. The user-level application 102 can take appropriate action when the error code is returned from the open( ) call.

If the file is not found in the ACL, then the above-mentioned internal flag can be set to NULL to indicate that authentication processing is not to be performed on the file for subsequent read and write operations.

It is noted that if the open attempt fails, then there is no need to access the ACL 131. The VFS simply returns to the application 102 the result code that was received from the NFS server 306.

CLOSE Routine

The API for the NFS close( ) function is unchanged. However, the processing of the invocation is modified in the following manner:

The application 102 invokes the close( ) function with a parameter that identifies the file; e.g., a file ID value that was returned by a successful open( ) call.

The VFS layer forwards the close( ) call to the NFS client 106.

The NFS client 106 communicates with the NFS server 306 in the usual manner to close the specified file.

The result of the close attempt is returned to the NFS client 106 and then to the VFS layer.

Assuming the close attempt was successful, the VFS layer can detect this by checking a result code returned from the NFS client 106. The composer 104 within the VFS layer can then indicated in some manner (e.g., clearing an internal flag associated with the file) that authentication processing of the file will no longer take place.

The VFS layer then returns the result of the close( ) call back to the application 102.

READ Routine and WRITE Routine

Figure 5:
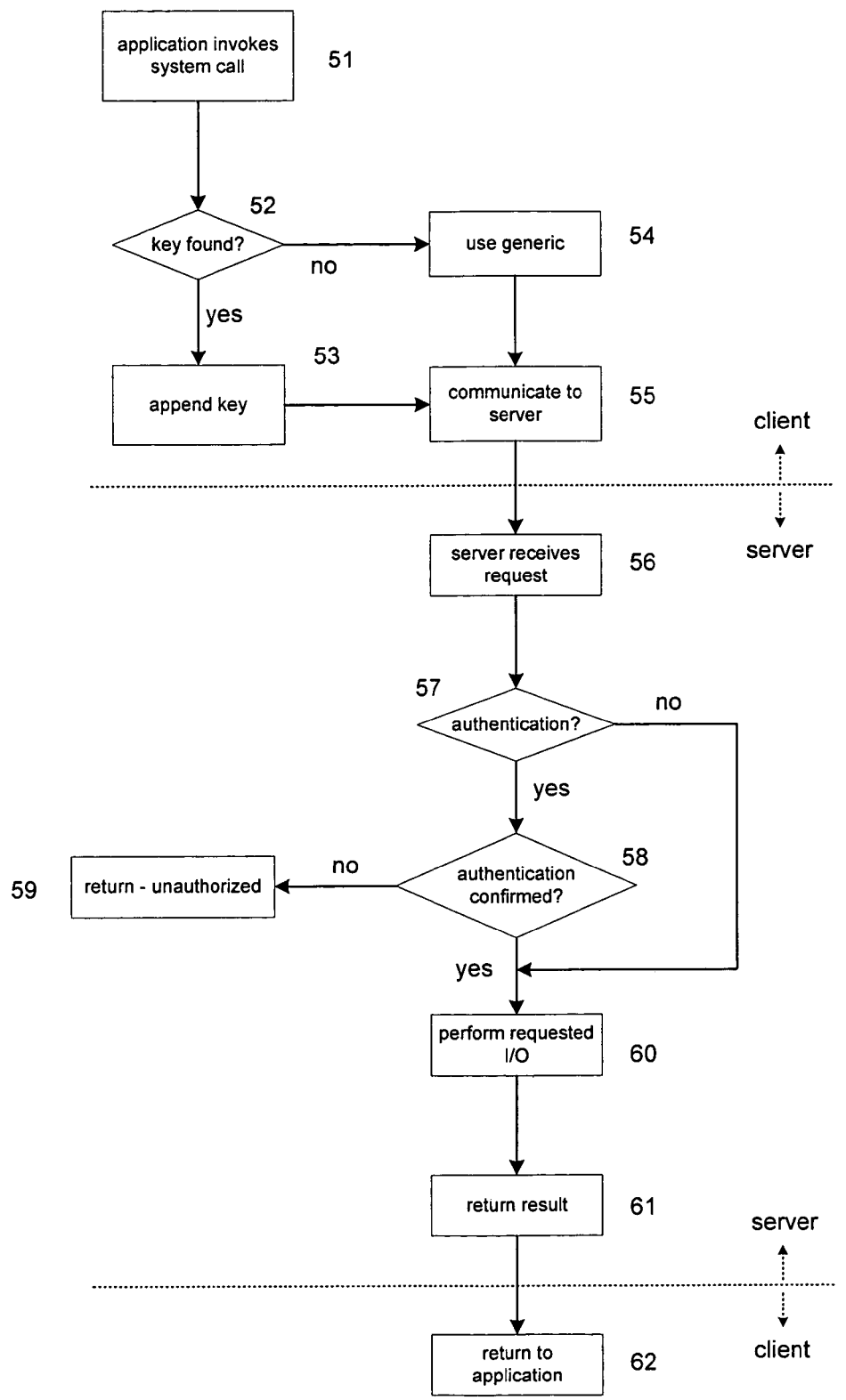
FIG. 5 shows the processing for reading and writing with authentication control in accordance with an embodiment of the present invention.

FIG. 5 shows the processing for the invocation of a read( ) function call and a write( ) function call. As will be explained below, the API for the NFS read( ) call and for the write( ) call are enhanced in accordance with this particular embodiment of the present invention to provide authenticated file access.

The user-level application 102 invokes the system call read( ) or write( ) subsequent to an open( ) call in order to perform I/O with the opened file, step 51. If an ID-key pair 45 was found for the opened file (step 52) during processing of the open( ) procedure call, then the composer 104 will invoke a modified API for the read or write function in the NFS client 106, step 53. In particular, the ID field 42 and the Key field 43 of the ID-key pair 45 is placed in an extended header (FIGS. 6A and 6B) of the modified NFS API.

If an ID-key pair 45 is not found, then the conventional (generic) API for the read or write operation is used, step 54. In accordance with a first implementation of this embodiment of the present invention, a single read API and a single write API can be provided. If authenticated read or write access is desired, the ID field 42 and the Key field 43 can be copied to extension fields in the header of the modified NFS API. If authenticated access is not desired, the then the extension fields can be set to NULL or some other value to indicate that authenticated access is not desired.

In a second implementation, different read APIs can be provided. A first read API can be provided that uses the extended header for authenticated read operations. A second read API (the standard, generic API) can be used for normal read operations which do not require authenticated processing. Similarly, a first write API can be provided that uses the extended header for authenticated write operations. A second write API (the standard, generic API) can be used for normal write operations which do not require authenticated processing.

Referring for a moment to FIGS. 6A and 6B, modifications respectively to the read and write APIs in the NFS client 106 are shown. The APIs shown in the figures are for version 2 of the NFS protocol. It can be appreciated, however, that similar enhancements can be made to later releases of the NFS protocol. With respect to FIG. 6A, the bolded portions indicate extension fields added to a header component of the read( ) API in accordance with this particular embodiment of the present invention, either by adding new arguments to the read API or by extending a data structure that is presently used by the read API. In this particular embodiment of the present invention, additional arguments are defined for the read API.

An "authentication_method" identifies the authentication technique that is being used in order to control access to a file. As will be seen, the ACL 131 shown in FIG. 3 uses the Key field 43 to determine whether an application is authorized to access the target file. It can be appreciated, however, that any authentication technique can be used. For example, certain files might require stronger authentication techniques in which some form encryption key system is employed. As another example, different vendors might employ authentication techniques different from each other. The specific authentication technique being used for a given file can be identified in the "authentication_method" component of the API.

Continuing with FIG. 6A, a "size_of_username" indicates the size (e.g., number of bytes) of the user name. A "username" contains the user's name. A "size_of_key" indicates the size (e.g., number of bytes) of the key. A "key" contains the key value. FIG. 6B shows the same extensions for the write API.

Continuing with FIG. 5, the read or write request is communicated to the server system 30, step 55. When the NFS server 306 receives the request (step 56), a determination is made whether authentication needs to be performed, step 57. This can be accomplished by inspecting the header for NULL or non-NULL values, in the case of the first implementation discussed above. Alternatively, this can be accomplished by virtue of different NFS APIs being invoked, in the case of the second implementation discussed above.

If authenticated access is desired, then the NFS server 306 sends the request to the decomposer 304 to authenticate the access attempt, step 58. The decomposer 304 accesses its local ACL 131, stored on the server 30. Using the file identification information provided in the header of the request, the decomposer 304 obtains an entry for the file. The file identification information can be the file name that was used in the open( ) call. The user information in the extended header is then compared against the ID-key pairs 45 in the Authentications field 46 of the obtained entry. If a match is not found, then the NFS server 306 returns with an error code indicating that access is unauthorized, step 59. For example, the NFS protocol defines an code NFSERR_ACCES which means permission denied.

If a match is found, then the requested I/O operation is performed (step 60) on the disks 32 (FIG. 1). Returning to the decision step 57, if it is determined that authentication is not needed then processing proceeds to step 60. Upon completion of the I/O operation, the result is returned to the NFS client 106, step 61. In the case of a write operation, the return typically involves returning a result code. In the case of a read operation, the return will include the data that was read. The NFS client 106, forwards the return to the VFS layer which then forwards the return to the application 102, step 62.

In accordance with the foregoing disclosed embodiment, the NFS layers 106, 306 were modified. As noted above, in accordance with another embodiment of the present invention, the NFS layers 106, 306 are unaffected. Instead, authentication processing is achieved by passing data in the data component (payload portion) of the NFS protocol. This aspect of the invention will now be discussed in further detail.

Enhanced Data Component

Figure 7A:
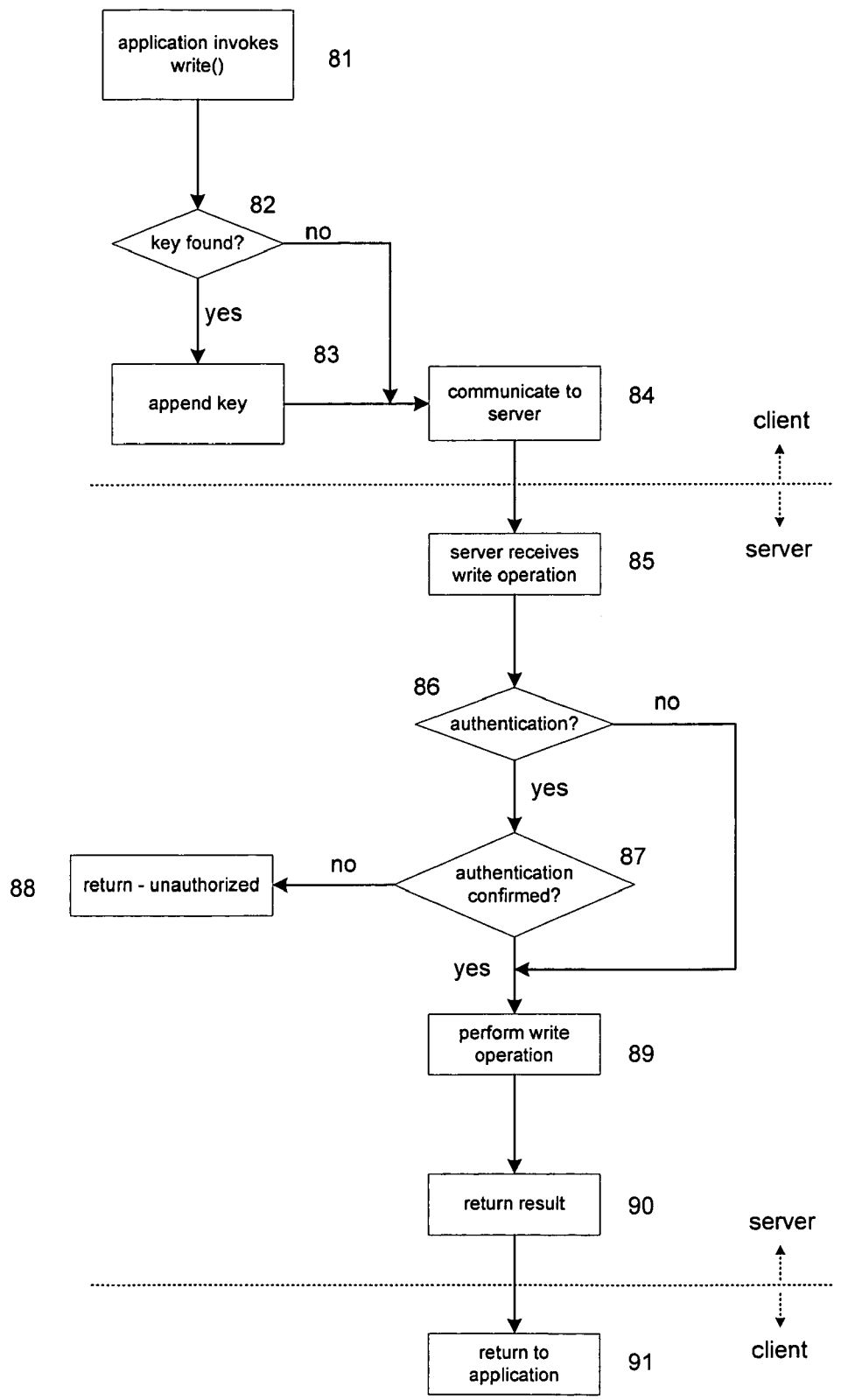
FIGS. 7A and 7B show processing in accordance with the embodiment of the present invention as respectively illustrated in FIGS. 8A and 8B.
Figure 8A:
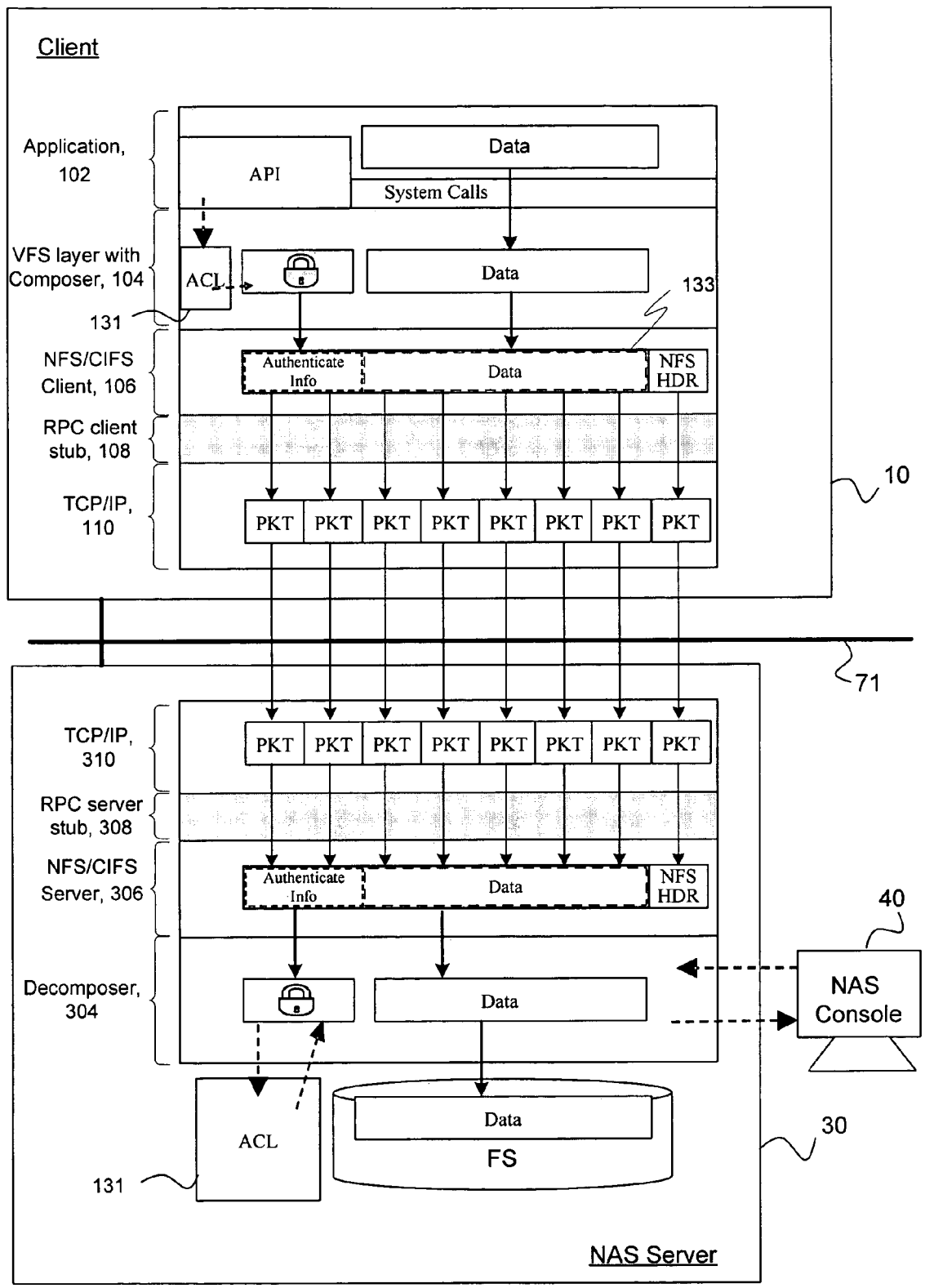
FIGS. 8A and 8B are functional diagrams of authentication processing respectively for write and read operations in accordance with an embodiment of the present invention.

In accordance with this embodiment of the present invention, the OPEN and CLOSE routines are modified in the same manner as discussed above. Processing for WRITE and READ operations are discussed below WRITE Routine In accordance with this embodiment of the present invention, the API for the NFS write( ) function is unchanged. However, the processing of the invocation of the write operation is modified in the manner as shown in the flow chart of FIG. 7A and illustrated in the functional diagram of FIG. 8A.

The user-level application 102 invokes the write( ) call subsequent to an open( ) call in order to perform I/O with the opened file, step 81. If an ID-key pair 45 was found for the open file (step 82), then the composer 104 will append the ID field 42 and the Key field 43 of the ID-key pair 45 to the data that is to be written by the write operation (step 83), thus increasing the size of the data component (133, FIG. 8A). In addition to the ID field 42 and the Key field 43, a code indicating the authentication method can be appended to the data component 133 as well. The value of the "count" parameter in the standard write API is increased by an amount equal to the size of the additional information. A standard call to the NFS client 106 API for the write operation is then made (step 84) to communicate the request to the server system 30. If the determination step 82 is negative (i.e., the file does not have a corresponding entry in the ACL 131), then processing proceeds to step 84.

When the server system 30 receives the request (step 85), a determination is made whether authentication needs to be performed, step 86. This can be accomplished by consulting the ACL 131 that is local to the server system 30 for an entry that corresponds to the file that is the target of the write operation. This action can be performed by the NFS server 306 or by the decomposer 304.

If an entry in the ACL 131 corresponding to the target file is found, then authentication is performed (step 87) prior to performing the write operation. The decomposer 304 accesses the additional information appended to the data component to obtain the user information. The user information is then compared against the ID-key pairs 45 in the Authentications field 46 of the entry obtained from the ACL 131 that corresponds to the target file. If a match is not found, then the NFS server 306 may return with specific error code that indicates a match was not found, or a standard error code that indicates the write operation is unauthorized (e.g., NFSERR_ACCES), step 88.

If a match is found, then the write operation is performed by accessing the disks 32 (FIG. 1), step 89. Returning to the decision step 86, if it is determined that authentication is not needed then processing proceeds to step 89. Upon completion of the write operation, the result is returned to the NFS client 106, step 90. The return typically involves simply returning a result code. The NFS client 106, forwards the result of the write operation to the VFS layer which then forwards it to the user-level application 102, step 91.

READ Routine

Figure 7B:
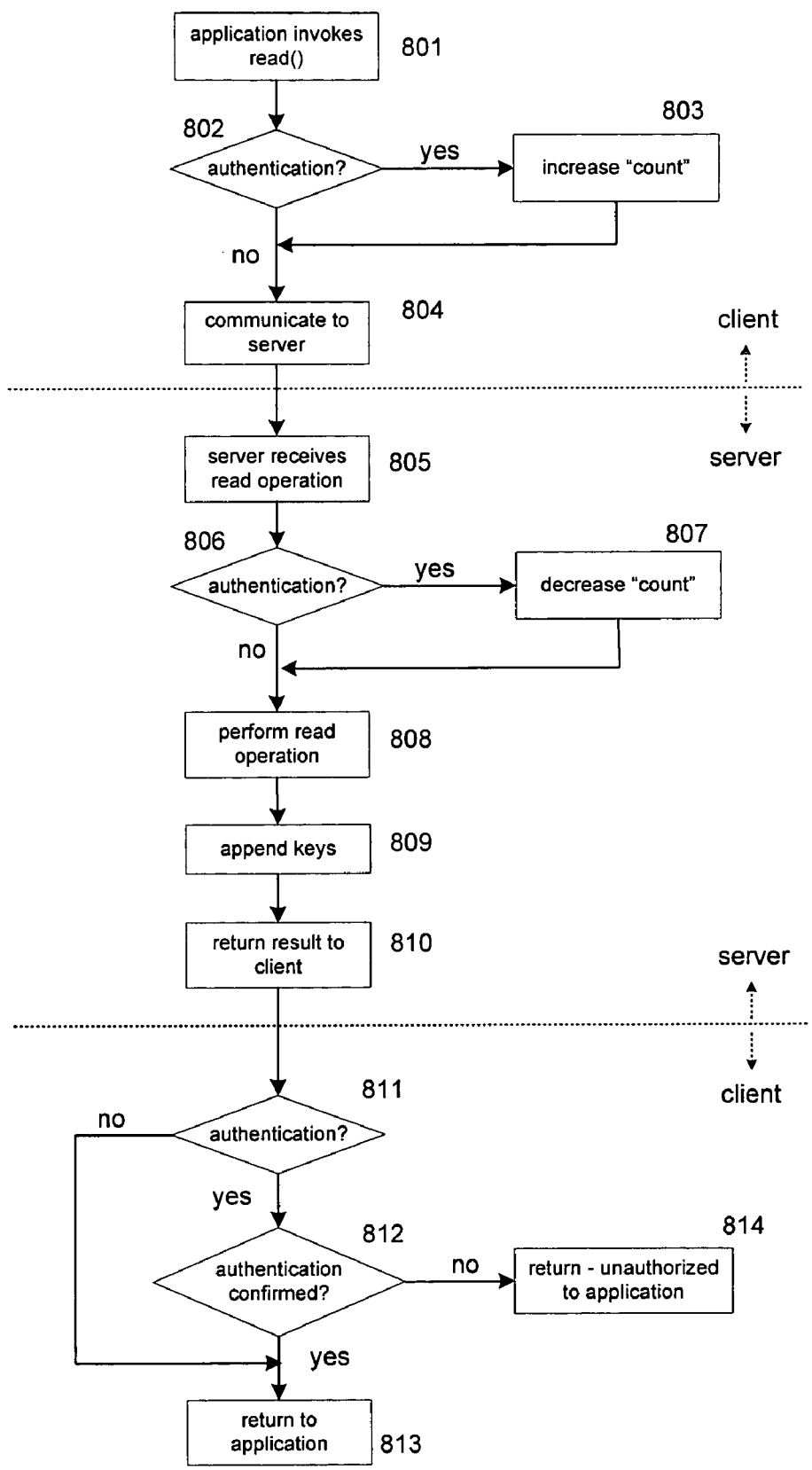
Figure 8B:
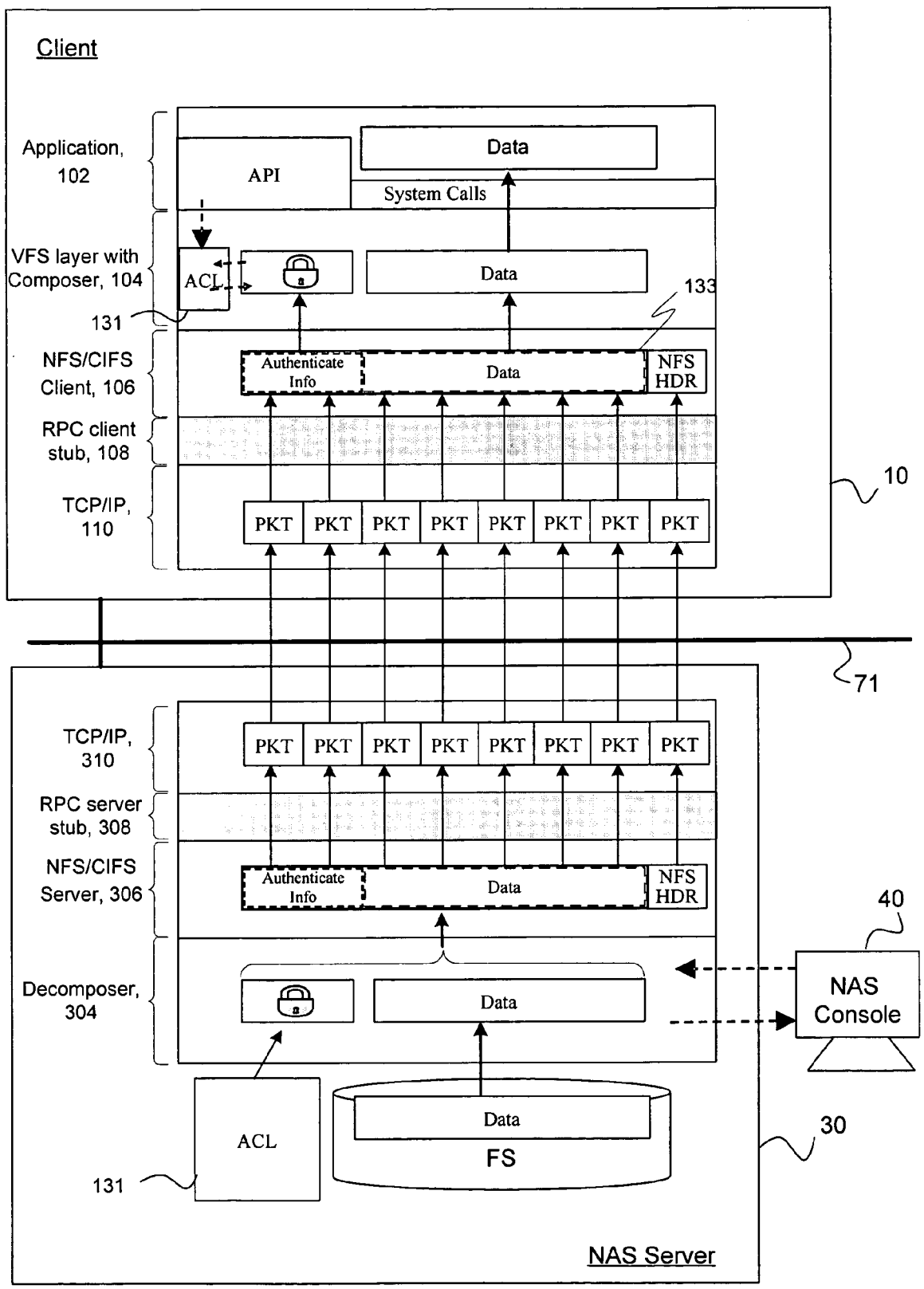

In accordance with this embodiment of the present invention, the API for the NFS read( ) function is unchanged. However, the processing of the invocation of the read operation is modified in the manner as shown in the flow chart of FIG. 7B and illustrated in the functional diagram of FIG. 8B.

The application 102 invokes the read( ) procedure call, step 801. If an entry in the ACL 131 for the opened file was found (step 802) during processing of the open( ) procedure call, then the value of the "count" parameter for the read( ) API in the NFS client 106 is increased to include the size of the entire Authentications field 46 (step 803); i.e., counting each ID-key pair 45. The reason for doing this will be explained below. The read request is then communicated to the server system 30, step 804.

When the server system 30 receives the read request (step 805), a determination is made (step 806) whether authentication processing is to be performed. The local ACL 131 is consulted using file identification information contained in the read request to obtain an entry associated with the file. If an entry is found, then the decomposer 304 will decrement the "count" parameter (step 807) by an amount equal to the size of the Authentications field 46 (see step 803 above). The decremented "count" parameter now reflects the size of the data to be read. Then, in a step 808, the read operation is performed on the disks 32 (FIG. 1).

If the read operation is successful, then in a step 809 all of the ID-key pairs 46 in the Authentications field 46 of the entry in the ACL 131 that corresponds to the target file are combined with the data that was read from the disks 32 to produce a data component 133. This data component is then communicated to the client 10 from the server 30 in a response to the read operation, step 810.

Since the server 30 does not "know" who the user that is associated with the user-level application 102, all of the ID-key pairs 46 from the ACL entry must be communicated back to the client system 10. It can therefore be appreciated why in step 803 the "count" parameter is incremented by the size of the Authentications field 46.

In a step 811, if the client 10 had previously determined, in step 802, that the target file of the read operation required authentication processing, then a determination is made (step 812) in the VFS layer whether the user associated with the application 102 is an authorized user. A user ID associated with the application 102 is obtained and a comparison is made against all of the ID-key pairs that were received from the server system 30. If no match is found, then the VFS layer will return an error code to the application 102, step 814. If a match is found, then the VFS layer will return the data that was read, step 813.

FIG. 9 illustrates the present invention as embodied in a database application. The composer and decomposer components are incorporated at the system level. Consequently, a user-level application such as the database application is not aware of the additional level of authentication that is being provided for individual files. The present invention can provide authentication capability for individual files, in addition to higher levels of authentication provided by conventional techniques; e.g., RPC provides client-based authentication.

What is claimed is:

1. A data access method between a first data processing system and a second data processing system, said second data processing system having a storage of data that is accessed by said first data processing system and which same storage of data is not maintained at said first data processing system, the method comprising:

maintaining a data structure at said first data processing system, said data structure comprising access control information received from said second data processing system, said access control information corresponding to a plurality of files stored on said second data processing system and including file identifiers of the plurality of files and user identifiers of users who can access the files, wherein said access control information is available at each of said first and second data processing systems;

receiving a data I/O request from an application-level program executing on said first data processing system, said data I/O request including first file identification information;

retrieving first access control information from said data structure at said first data processing system based upon said first file identification information;

generating a data access request including data which is associated with said data I/O request, said first access control information, and said first file identification information appended to said data; and communicating said data access request from said first data processing system to said second data processing system, wherein said second data processing system selectively performs a data operation based on a comparison of the first access control information included with the data request and second access control information available at the second data processing system.

2. The method of claim 1 further comprising accessing user identification information in response to receiving said data I/O request, wherein said first access control information is obtained based on said user identification information.

3. The method of claim 1 wherein said data access request is a read operation request.

4. The method of claim 1 wherein said data access request is a write operation request.

5. The method of claim 1 wherein said second data processing system is a NAS (network attached storage) server.

6. A method for accessing information, said information being stored in a second data processing system, the method comprising:

establishing second access control data in the second data processing system, the second access control data corresponding to a plurality of files stored in the second data processing system which same plurality of files is not stored in the first data processing system;

uploading first access control data from the second data processing system to a first data processing system in response to an upload request, the first access control data corresponding to the second access control data at a first time, wherein the first data processing system maintains the first access control data and the second data processing system maintains the second access control data, and wherein said first and second access control data comprise file identifiers of files and corresponding user identifiers of users who can access said files;

receiving a data request from the first data processing system including first access control information selected from the first access control data and file identification information;

obtaining second access control information from the second access control data at a second time based on said file identification information;

comparing said first access control information from the data request corresponding to the first time and the second access control information corresponding to the second time, wherein if said comparison between said first and second access control information produces a no match outcome, then communicating an error message to said first processing system indicative of a negative comparison; and wherein if said comparison between said first and second access control information produces a match outcome, then performing a data operation in accordance with said data request and communicating a result of said data operation to said first processing system.

7. The method of claim 6 wherein said data request is a write operation request, wherein said first access control information is included among data associated with said write operation request.

8. The method of claim 6 wherein said first and second access control information each include user identification information, and wherein said comparison step further comprises comparing user identification information included in said first access control information and user identification information included in said second access control information.

9. The method of claim 6 wherein said data request is a read operation request.

10. The method of claim 6 wherein said data request is a write operation request.

11. The method of claim 6 wherein said second processing system is a NAS (network attached storage) server.

12. A method for communicating data between a first system and a second system, wherein said first system comprises system-level programs and application-level programs, said system-level programs providing system services, said application-level programs accessing said system services via said system-level programs, said data being stored in a storage system of said second system, the method comprising:

receiving an open operation request from an application-level program at said first system, said open operation request including first file identification information that identifies a first file;

obtaining first access control information associated with said first file from a storage area of said first system, said first system receiving the first access control information from said second system, wherein said access control information includes identifiers of said stored data and corresponding user identifiers of users who can access said stored data;

communicating a data request to said second system to service said open operation request, said data request including said first access control information and said first file identification information;

in said second system, obtaining second access control information including a candidate password that is associated with said first file, wherein said first system maintains said first access control information and said second system maintains said second access control information, said first and second access control information corresponding to files stored in the storage system of said second system and not in said first system; and if said second access control information matches said first access control information, then performing a data access operation on said storage system of said second system to service said data request and communicating a result of said data request service to said first system.

13. The method of claim 12 further comprising accessing a user identifier that is associated with said application-level program, wherein obtaining said first file identifier is further based on said user identifier.

14. The method of claim 12 wherein said data request that is communicated to said second system is a write request, said write request including a data component comprising data to be written and said first access control information.

15. The method of claim 12 wherein said second system is a NAS (network attached storage) server.

16. A method for exchanging data between a first data processing system and a second data processing system, said data being stored in a storage system of said second data processing system and accessed independently of data stored in the first data processing system, the method comprising:

receiving, in said first data processing system, a data access request;

obtaining, in said first data processing system, first access control information that is associated with a file that is the target of said data access request, the first access control information including corresponding user identifiers of users who can access said file, said first data processing system receiving said first access control information from said second data processing system and storing a copy thereof; and if said data access request includes a write operation, then communicating a write request to said second data processing system to service said write operation, said write request including a data component comprising said write-data and said first access control information, wherein said second data processing system responds to receiving said write request by:

obtaining second access control information from a storage of said second data processing system associated with the target of said write request;

obtaining said first access control information from said data component; and based on a comparison between said first access control information and said second access control information, selectively writing said write-data to said storage system, and wherein if said data access request includes a read operation, then communicating a read request to said second data processing system to service said read operation, wherein in response to said second data processing system receiving said read request, then:

accessing read-data from said storage system;

obtaining second access control information associated with a file that is the target of said read operation; and communicating a read result to said first data processing system, said read result including a data component comprising said read-data and said second access control information, wherein said first data processing system obtains said second access control information from said data component, wherein said first data processing system selectively communicates a positive response to said application-level program based on a comparison between said first access control information and said second access control information performed at said first data processing system.

17. The method of claim 16 wherein said read request includes a count field that is a sum of a data size of data to be read and a data size of said first access control information.

18. A storage server system comprising:

a data processing portion;

a storage component;

a communication interface for communication over a data network; and program code, said program code configured to operate said data processing portion to:

upload access control information from the storage server system to a client system, the access control information to a plurality of files stored in the storage server system which same plurality of files is not maintained at the client system, wherein the client system stores a copy of the access control information;

receive a data request from the client system, said data request including access control information from the client system and file identification information, said access control information and file identification information corresponding to an open operation performed by an application-level program at the client system;

obtain local access control information that is stored in said data storage server based on said file identification information, said local access control information stored at said data storage server and comprising a candidate password that is associated with a file identified by said file identification information;

communicate an error message to said client system indicative of a negative comparison between said access control information with said local access control information, if a comparison between said access control information and said local access control information produces a no match outcome; and perform a data operation in accordance with said data request and communicate a result of said data operation to said client system, if a comparison between said access control information and said local access control information produces a match outcome.

19. The system of claim 18 wherein said data request is for a write operation, wherein said data request includes a data component, said data component comprising data to be written and said access control information.

* * * * *